US008225275B2

(12) United States Patent
Torgerson et al.

(10) Patent No.: US 8,225,275 B2
(45) Date of Patent: Jul. 17, 2012

(54) SYSTEM AND METHOD FOR PROVIDING INDICATORS OF TEXTUAL ITEMS HAVING INTRINSIC EXECUTABLE COMPUTATIONAL MEANING WITHIN A GRAPHICAL LANGUAGE ENVIRONMENT

(75) Inventors: Jay Ryan Torgerson, Hopkinton, MA (US); Ebrahim Mehran Mestchian, Newton, MA (US); Vijay Raghavan, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 1009 days.

(21) Appl. No.: 11/827,451

(22) Filed: Jul. 11, 2007

(65) Prior Publication Data

US 2007/0261020 A1 Nov. 8, 2007

Related U.S. Application Data

(63) Continuation of application No. 11/157,995, filed on Jun. 20, 2005, now Pat. No. 7,844,943.

(51) Int. Cl.
*G06F 9/44* (2006.01)

(52) U.S. Cl. ........ 717/105; 717/104; 717/106; 717/109; 717/113

(58) Field of Classification Search ........................ None
See application file for complete search history.

(56) References Cited

U.S. PATENT DOCUMENTS

| | | | | |
|---|---|---|---|---|
| 5,408,603 | A * | 4/1995 | Van de Lavoir et al. | 715/763 |
| 6,434,547 | B1 * | 8/2002 | Mishelevich et al. | 1/1 |
| 6,799,718 | B2 | 10/2004 | Chan et al. | |
| 7,310,784 | B1 | 12/2007 | Gottlieb et al. | |
| 7,552,116 | B2 * | 6/2009 | Chang et al. | 1/1 |
| 2002/0023257 | A1 | 2/2002 | Charisius et al. | |
| 2002/0038206 | A1 | 3/2002 | Dori | |
| 2004/0017392 | A1 | 1/2004 | Welch | |
| 2004/0075699 | A1 | 4/2004 | Franchi et al. | |
| 2004/0088688 | A1 | 5/2004 | Hejlsberg et al. | |
| 2005/0015747 | A1 | 1/2005 | Zatloukal et al. | |
| 2005/0188332 | A1 * | 8/2005 | Kolman | 715/822 |

FOREIGN PATENT DOCUMENTS

| | | |
|---|---|---|
| EP | 0694879 B1 | 1/1996 |
| WO | WO-01/73546 A2 | 10/2001 |

OTHER PUBLICATIONS

Bultan, Tevfik; Action Language: a specification language for model checking reactive systems; 2000; ICSE '00: Proceedings of the 22nd international conference on Software engineering; pp. 335-344.*

(Continued)

*Primary Examiner* — Insun Kang
(74) *Attorney, Agent, or Firm* — Nelson Mullins Riley & Scarborough LLP (57) ABSTRACT

An electronic device with a graphical language environment that includes a method which examines a graphical model to identify textual items having intrinsic executable computational meaning within the graphical model is discussed. The method identifies at least one textual item with intrinsic executable computational meaning. The method further provides an indicator for the at least one identified textual item with intrinsic executable computational meaning in a display of the graphical model. The indicator may be based upon a characteristic of the identified textual item.

27 Claims, 6 Drawing Sheets

OTHER PUBLICATIONS

Miyashita, Ken et al., "Declarative Programming of Graphical Interfaces by Visual Examples," Proceedings of the 5th annual ACM symposium on User Interface Software and Technology, pp. 107-116 (1992).

Sarkar, Soumen et al., "Code Generation Using XML Based Document Transformation," TheServerSide, Your J2EE Community (2001).

"Rational Rose RealTime Toolset Guide," retrieved from the internet: http://www.com/docs/v2002/RoseRT/toolsetguide.pdf (2002).

International Search Report for Application No. PCT/US2006/024773, dated Jun. 20, 2005.

European Office Action for Application No. 06785568.4, dated Feb. 11, 2011.

\* cited by examiner

SYSTEM AND METHOD FOR PROVIDING INDICATORS OF TEXTUAL ITEMS HAVING INTRINSIC EXECUTABLE COMPUTATIONAL MEANING WITHIN A GRAPHICAL LANGUAGE ENVIRONMENT

CROSS-REFERENCE TO RELATED APPLICATION

This application is a continuation of U.S. patent application Ser. No. 11/157,995, which was filed Jun. 20, 2005, by Torgerson, et al., for A System And Method For Providing Indicators Of Textual Items Having Intrinsic Executable Computational Meaning Within A Graphical Language Environment.

FIELD OF THE INVENTION

The illustrative embodiment of the present invention relates generally to graphical models, and more particularly to a mechanism for providing indicators for identified textual items within the graphical model that have intrinsic executable computational meaning.

BACKGROUND

Computer programmers spend large amounts of time editing and debugging computer programs as part of the process by which the programs are created and optimized. In a textual language environment the editing and debugging process requires the computer programmer to look at many lines of code. It can frequently be difficult to pick out important sections of code from all of the code surrounding the section of code that is of interest to the programmer. As a result, textual editors and debuggers often include features which highlight or otherwise visually identify semantically sensitive syntax that has meaning to the programmer.

In a graphical language environment, a graphical model is displayed which includes many graphical elements with interspersed textual elements. Some of the textual elements are labels for various components, while other textual elements represent items with intrinsic executable computational meaning that is related to the text and is of interest to the programmer attempting to edit or optimize the model. Unfortunately, conventional graphical language environments fail to provide an automated mechanism for providing an indicator for textual elements which have intrinsic executable computational meaning within a displayed graphical model where the indicator is based upon a characteristic of the identified textual item.

BRIEF SUMMARY

The illustrative embodiment of the present invention provides a mechanism for providing indicators of textual items within a displayed graphical model which have intrinsic executable computational meaning. The illustrative embodiment utilizes the mapping performed by a language processor evaluating the model to identify those textual items within the model that are executable based on the intrinsic meaning of the textual item and affect the model execution. The displayed graphical model is altered to provide an indicator of which textual items within the graphical model have intrinsic executable computational meaning with the indicator being based on a characteristic of the identified textual item.

In one aspect of the illustrative embodiment, a computational device with a graphical language environment includes a method which examines a graphical model to identify textual items having intrinsic executable computational meaning within the graphical model. The method identifies at least one textual item with intrinsic executable computational meaning. The method further provides an indicator for the at least one identified textual item with intrinsic executable computational meaning in a display of the graphical model.

In another aspect of the illustrative embodiment, a system for indicating textual items with intrinsic executable computational meaning within a graphical environment includes a graphical model that includes textual and graphical components. The system further includes a language processor for evaluating the textual and graphical components in the graphical model to produce executable code. Additionally, the system includes a listing generated as a result of the evaluation of the textual components in the graphical model by the language processor. The listing identifies at least one textual component with intrinsic executable computational meaning. The identified at least one textual component with intrinsic executable computational meaning is altered in appearance in a display of the graphical model to a user based on a characteristic of the identified textual item.

In still another aspect of the illustrative embodiment, a distributed system for indicating textual items with intrinsic executable computational meaning within a graphical environment includes a server hosting a graphical language environment. The graphical language environment further includes a graphical model that includes textual and graphical components. The graphical language environment also includes a language processor for evaluating the textual and graphical components in the graphical model to produce executable code. Additionally, the graphical language environment includes a listing of executable textual components in the graphical model generated as a result of the evaluation of the graphical model by the language processor. The listing identifies textual components with intrinsic executable computational meaning in the graphical model. The identified textual components with intrinsic executable computational meaning are altered in appearance in a display of the graphical model to a user. The distributed system further includes a client communicating with the server over a network and a display device in communication with the client. The display device displays the graphical model with the altered textual items to a user.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention provides a mechanism to automatically provide an indicator for textual elements that have intrinsic executable computational meaning in a displayed graphical model. The provided indicator may be based upon a characteristic of the textual item. The ability to distinguish between indicated text with intrinsic executable computational meaning and other textual items allows programmers to more efficiently edit and optimize graphical models by allowing the programmers to focus in on significant sections of the model.

The phrase "intrinsic executable computational meaning" is used herein to distinguish between those textual items found in graphical models which have executable computational meaning that is related to the word itself (e.g.: program language keywords, event names, data, graphical function names, linked requirement, hard coded numbers, etc.), those textual items which are used in computations but have no intrinsic meaning (e.g.: a label for a block component in a model that is used as an alphabetical tiebreaker during the processing of components—there is executable computational meaning associated with the textual item but it is extrinsically assigned to the item rather than stemming from the processing of the word), and textual items that do not result in any sort of code that affects the execution of the model (e.g.: a textual comment that is not processed by the compiler or interpreter).

Figure 1:
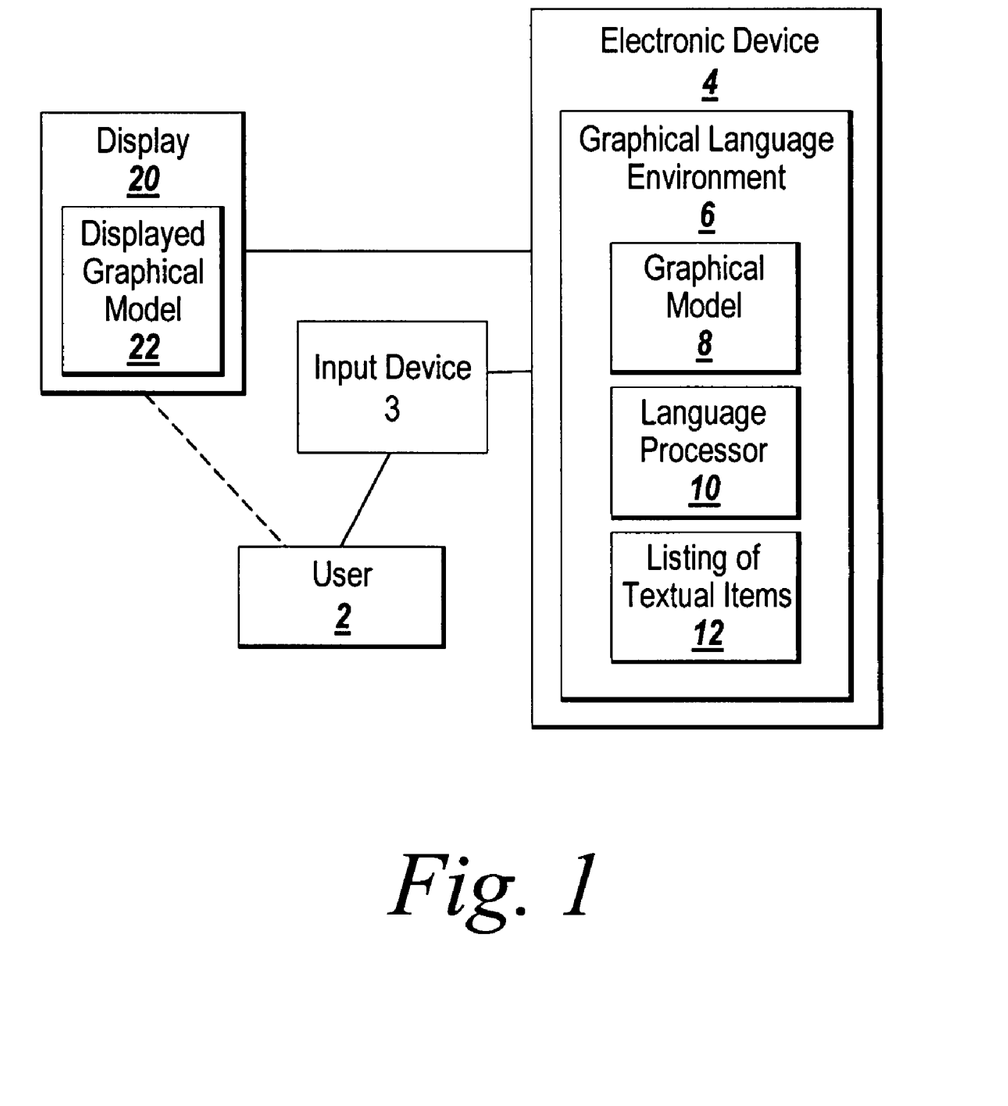
FIG. 1 depicts an environment suitable for practicing the illustrative embodiment of the present invention.

FIG. 1 depicts an environment suitable for practicing the illustrative embodiment of the present invention. A user 2 accesses an electronic device 4 using an input device 3 such as a mouse or keyboard. The electronic device 4 includes a graphical language environment such as SIMULINK or STATEFLOW, both from The MathWorks, Inc. of Natick, Mass. The graphical language environment includes at least one graphical model 8. The graphical language environment 6 also includes a language processor 10. The language processor 10 is used to examine the graphical model 8 and generate a listing of identified textual items with intrinsic executable computational meaning The listing of identified textual items with intrinsic executable computational meaning 12 may be derived from an abstract syntax tree. Abstract syntax trees are discussed in greater detail below. The electronic device 4 is in communication with a display 20 which is used to present a display of the graphical model being examined, including the indicated textual items having intrinsic executable computational meaning.

The electronic device 4 may be a server, mainframe, laptop, workstation, PDA or some other type of electronic device equipped with a processor and capable of supporting the graphical language environment 6. The graphical language environment 6 may be a block diagram environment such as SIMULINK, a state diagram and data-flow based diagram environment such as STATEFLOW, LABVIEW from National Instruments Corporation of Austin, Tex., Unified Modeling Language (UML) environments or some other type of modeling environment in which models include both graphical and textual components. The graphical model 8 may be a block diagram model, state-diagram model, a data-flow model or some other type of model.

The language processor 10 in the graphical language environment 6 may process the graphical model 8 in a number of different ways in order to provide the indicators of textual items with intrinsic executable computational meaning in the graphical model. In one implementation, the language processor examines and tokenizes the textual items present in the graphical model 8 such as STATEFLOW action language present in states or transitions. The tokens may then be looked up in a data dictionary 14 to determine which tokens have intrinsic executable computational meaning and arranged in a parse tree. The parse tree may then be walked with the corresponding textual item in the graphical model for each node being assigned an indicator to show it has intrinsic executable computational meaning.

In an alternative implementation, the language processor may evaluate the entire model to generate code before identifying which textual items in the graphical model have intrinsic executable computational meaning. Graphical components in the graphical model 8 may represent and be translated into program code by the language processor 10. Similarly, the textual items/components in the graphical model 8 may also represent underlying program code. How the textual items in the graphical model 8 are treated by the language processor depends upon whether they have intrinsic executable computational meaning or whether they lack intrinsic executable computational meaning. The graphical model components, textual and graphical; are first converted into the corresponding underlying code associated with the components. For example, for a SIMULINK model, REAL TIME WORKSHOP may be used to generate the code. The language processor 10 then tokenizes the underlying code and the executable tokens are parsed into an abstract syntax tree in a manner consistent with the language being processed. The use and creation of an abstract syntax tree are discussed in further detail below. The listings of textual items that have intrinsic executable computational meaning are flagged in the tree in the illustrative embodiment. A data dictionary 14 may be used to identify which items have intrinsic executable computational meaning. The abstract syntax tree serves as the basis for providing a visual indicator for the textual items by quickly searching the tree and highlighting or otherwise altering the appearance of the corresponding item in the displayed graphical model 22. It should be noted that the use of the abstract syntax tree is optional, and other listings of textual components with intrinsic executable computational meaning are considered to be within the scope of the present invention.

Figure 2:
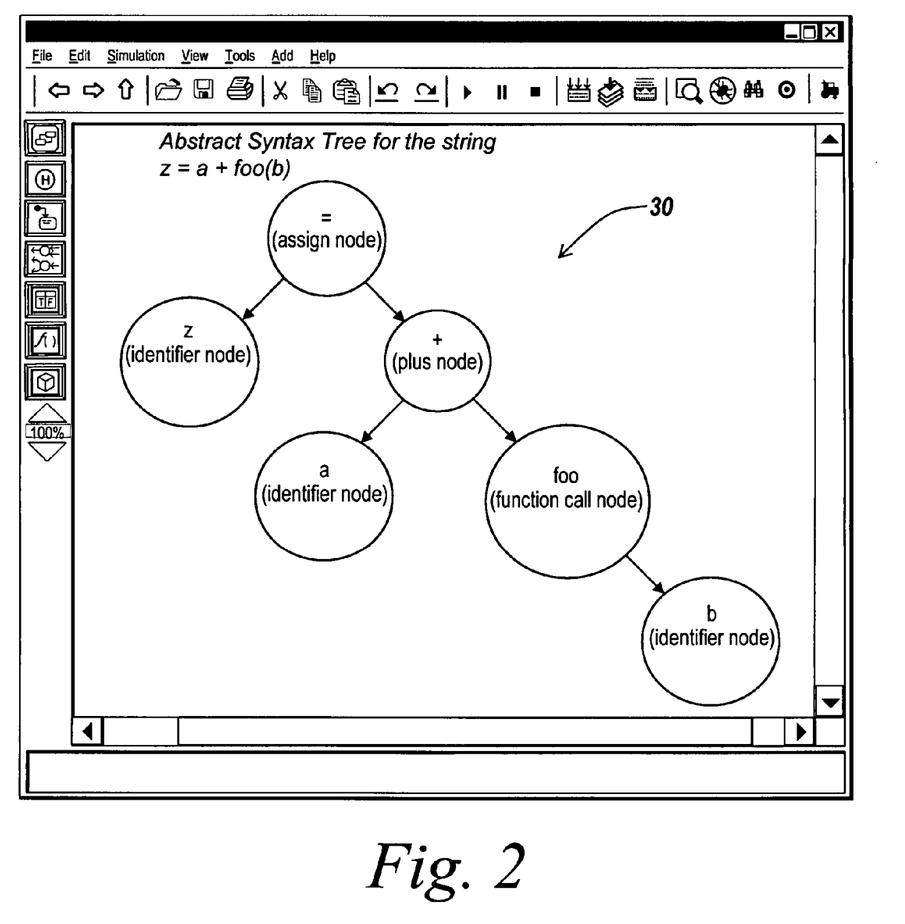
FIG. 2 depicts an abstract syntax tree of the type that may be produced by the present invention in order to list identified textual items with intrinsic executable computational meaning.

An example of the language processor 10 tokenizing and parsing code to create the abstract syntax tree of the present invention is now illustrated. It will be appreciated that although the example of the tokenizing and parsing process given herein is made starting with reference to a traditional line of code rather than a component of a graphical model, the components in the graphical model 8, both graphical and textual, correspond to and are translated into code before execution. An initial line of code such as:

$$z=a+foo(b);$$

may be tokenized by the language processor 10 into the following tokens:

{"z", "=", "a", "+", "foo", "(", "b",")"}

The tokens in turn may then be parsed into an abstract syntax tree 30 such as that depicted in FIG. 2. Nodes from tokens that started as textual items are noted and the tree may then be walked to identify where to provide visual indicators in the corresponding textual items/components in the graphical model 8. Provisions may be made so that the language processor 10 identifies any textual items with extrinsic executable computational meaning (such as the aforementioned labels for blocks that are used as tiebreakers in determining execution order) differently than those textual items with intrinsic executable computational meaning. The language processor consults pre-determined parameters to determine the type of indicator provided (e.g. different font colors, shadings, marquee effects, blinking effects, etc.). In an alternate implementation, the user may be presented with a choice of the type of indicator to be used.

Figure 3:
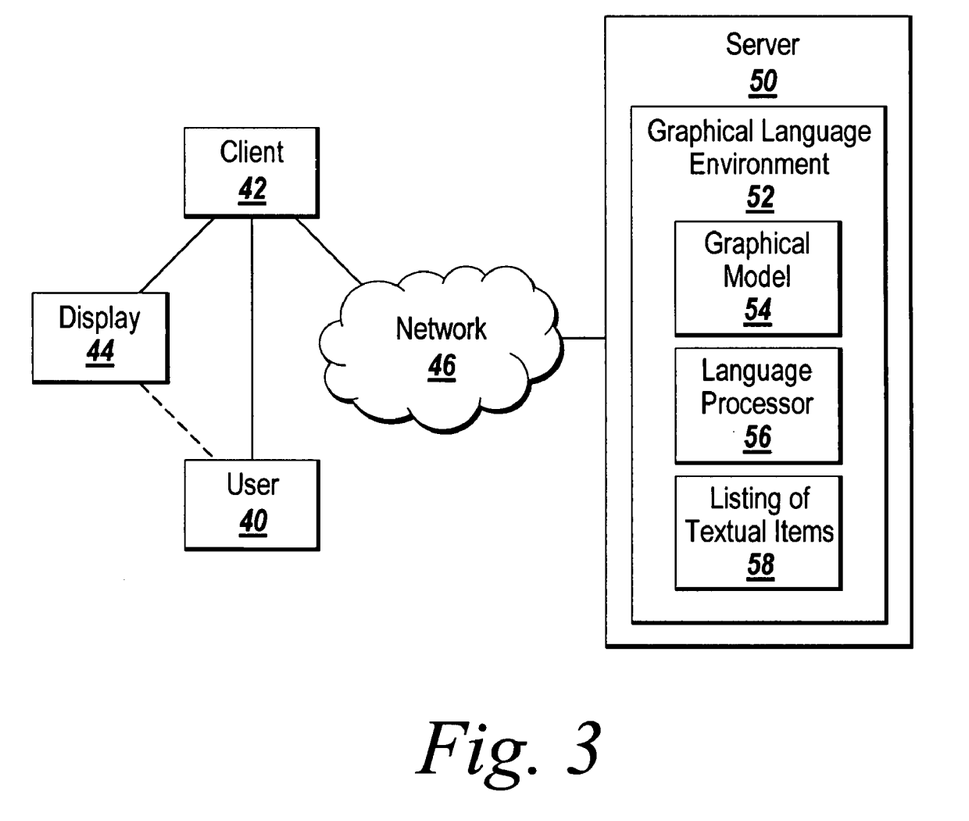
FIG. 3 depicts an alternate distributed environment suitable for practicing the illustrative embodiment of the present invention.

The illustrative embodiment of the present invention may also be practiced utilizing a distributed architecture that enables the processing of the graphical model to occur at a remote location from the user. FIG. 3 depicts an alternate distributed environment suitable for practicing the illustrative embodiment of the present invention. A server 50 hosts a graphical language environment 52. The graphical language environment 52 includes at least one graphical model 54, a language processor 56 and a listing of identified textual items with intrinsic executable computational meaning 58. The listing of identified textual items with intrinsic executable computational meaning 58 may appear as an abstract syntax tree generated by the language processor processing the graphical model. Alternatively, another type of listing which contains a record of the textual items with intrinsic executable computational meaning in the graphical model 54 may be kept in the graphical language environment. The abstract syntax tree, or other type of alternative listing, is checked to determine the identified textual elements with intrinsic executable computational meaning and indicators are assigned to the corresponding textual items in the graphical model 54.

A user 40 accessing a client 42 communicates with the server 50 and the graphical language environment 52 over a network 46. The network may be a local area network (LAN), wide area network (WAN), an extranet, intranet, internet, the Internet or some other type of network enabling the client 42 to communicate with the server 50. Likewise, the network 46 may be a wired network or a form of wireless network. A display of the graphical model showing the indicators of the textual items/components in the graphical model 54 that have intrinsic executable computational meaning is transmitted over the network 46 to the client 42 and displayed to the user 40 on a display device 44 that is in communication with the client. It will be appreciated by those skilled in the art that although the terms "client" and "server" have been used to discuss the remote architecture implementation above, other electronic devices equipped with processors and capable of performing the computational processes discussed herein that are not arranged in a client-server relationship may also be used to practice the present invention in a distributed architecture.

Figure 4:
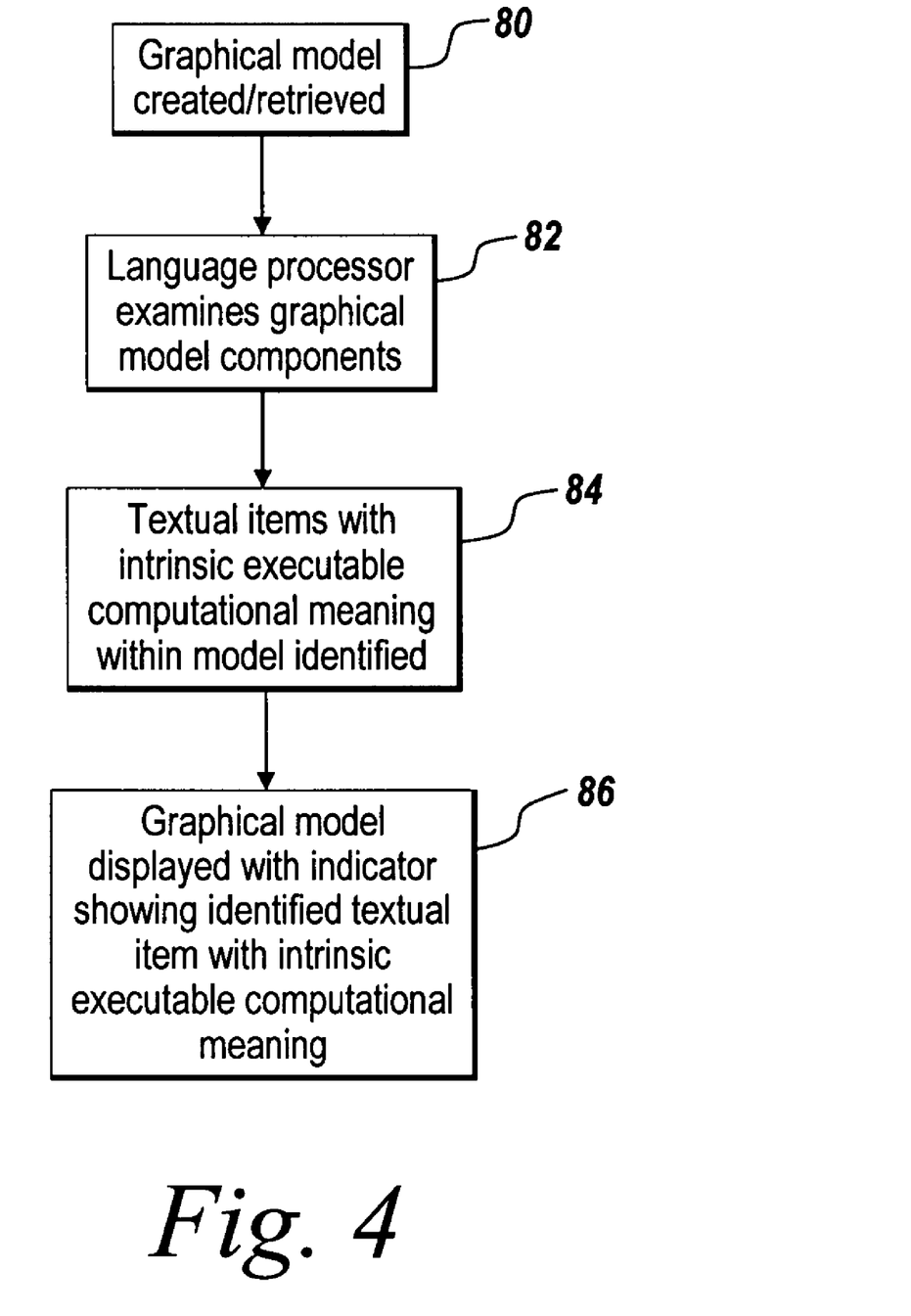
FIG. 4 depicts a sequence of steps followed by the illustrative embodiment of the present invention to identify and provide indicators for textual elements with intrinsic executable computational meaning within a graphic model.

FIG. 4 depicts the sequence of steps that may be followed by the illustrative embodiment of the present invention to provide indicators of textual components in a graphical model that have intrinsic executable computational meaning. The sequence begins when the user creates or retrieves the graphical model (step 80). The language processor 10 processes the graphical model and examines the graphical model components (step 82). The listed textual items with intrinsic executable computational meaning within the model are then noted, either by using an abstract syntax tree or by using some other type of listing of processed components (step 84). The graphical model is then displayed with an indicator showing the identified textual items with intrinsic executable computational meaning (step 86).

The form of the indicator may be based on the type of textual item or some other characteristic of the identified textual item with intrinsic executable computational meaning. Those skilled in the art will appreciate that the type of indicator used to mark the textual items having intrinsic executable computational meaning may vary depending upon the implementation of the present invention. For example, the identified textual item may be highlighted so as to stand out from the surrounding components in the graphical model. Alternatively, the identified textual item may be assigned a different font color than the surrounding components in the graphical model. In one implementation, multiple colors may be used to distinguish between different types of textual items with intrinsic executable computational meaning. For example, an event name may receive one color while a keyword receives a different color. Similarly, the textual item may be boxed or underlined so as to draw attention the item. Other variations will be readily apparent to those skilled in the art.

Figure 5A:
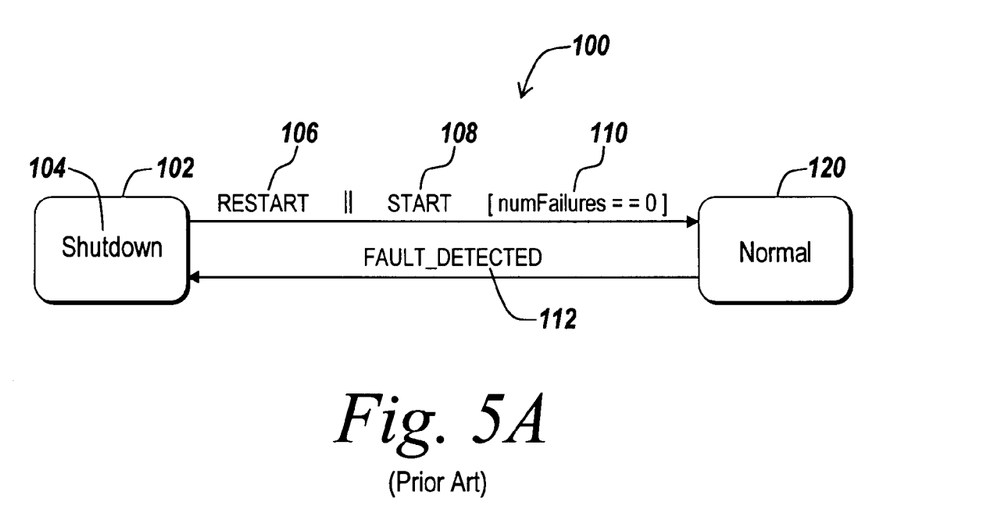
FIG. 5A (Prior Art) depicts a graphical model.
Figure 5B:
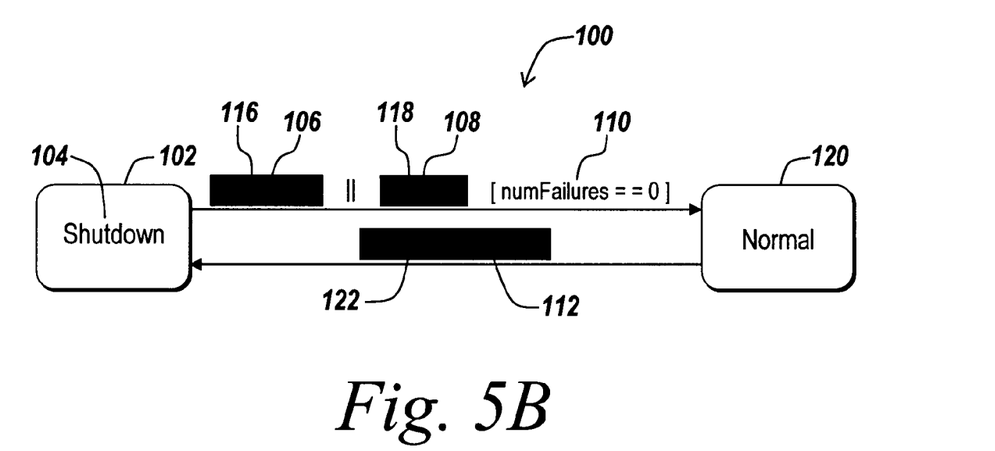
FIG. 5B depicts the graphical model of FIG. 5A in which the illustrative embodiment of the present invention provides visual indicators for identified textual elements with intrinsic executable computational meaning within a graphical model.

FIG. 5A (prior art) and FIG. 5B depict an example of the application of the present invention to a graphical model. FIG. 5A (prior art) depicts a graphical model 100 with a Shutdown state 102 and a Normal state 104. The transition from the Shutdown state 102 to the Normal state 104 includes textual items RESTART 106, START 108 and variable numFailures==0 (110). Similarly, the transition from the Normal State 104 to the Shutdown state 102 includes the textual item FAULT_DETECTED 112.

FIG. 5B depicts the graphical model 100 following the application of the present invention to the graphical model. The graphical model 100 depicts a Shutdown state 102 and a Normal state 104. The labels for both states are unchanged as neither label represents a textual item having intrinsic executable computational meaning. The transition from the Shutdown state 102 to the Normal state 104 still includes textual items RESTART 106, START 108 and variable numFailures==0 (110). Similarly, the transition from the Normal State 104 to the Shutdown state 102 still includes the textual item FAULT_DETECTED 112. However, the textual items RESTART 106, START 108 and FAULT_DETECTED 112 in the transitions between states have all been boxed 116, 118 and 122 to indicate that they represent textual items having intrinsic executable computational meaning. In the present example the textual items are event names and refer to the event code for the events that trigger the transitions between states.

Figure 6A:
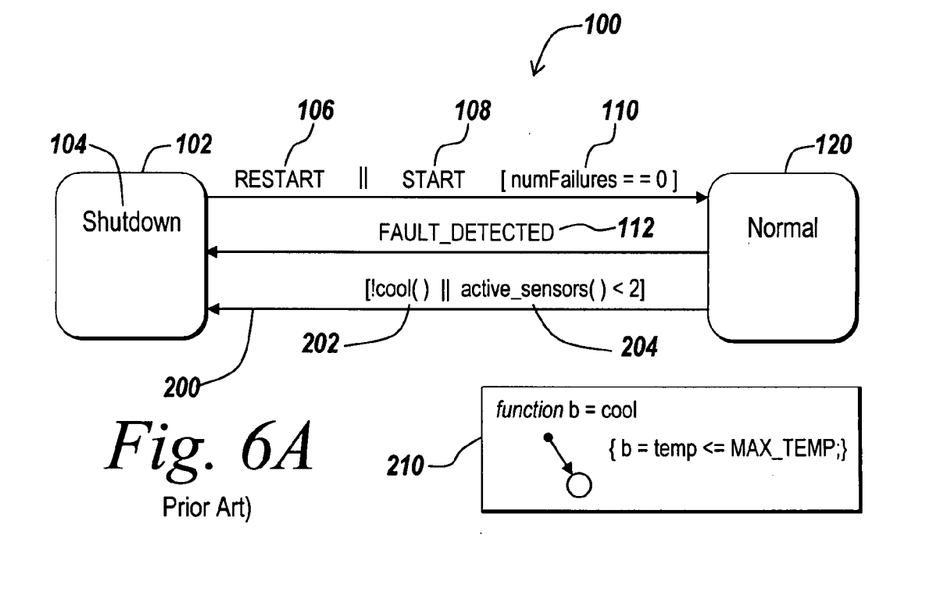
FIG. 6A (Prior Art) depicts the graphical model of FIG. 5A with a second transition between states.
Figure 6B:
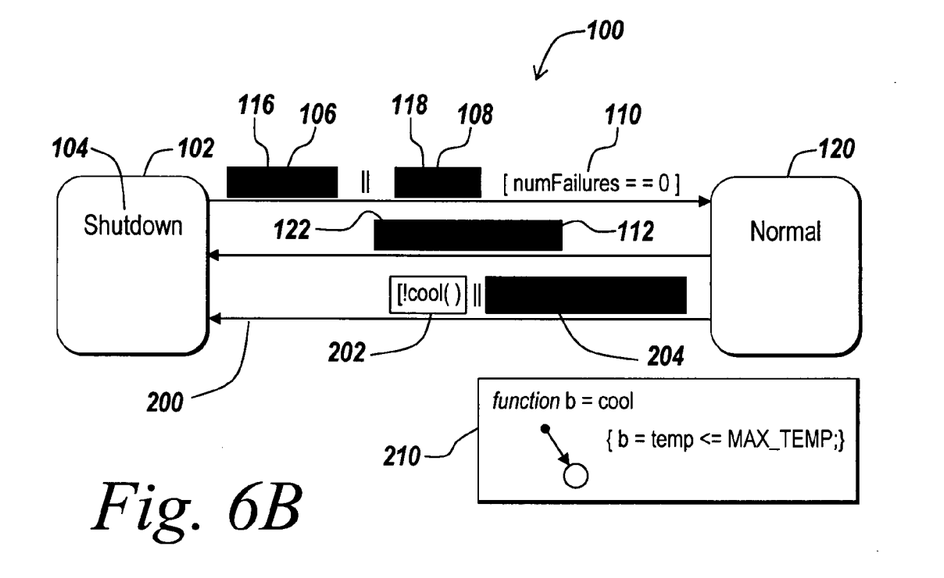
FIG. 6B depicts the graphical model of FIG. 5B in which the illustrative embodiment of the present invention provides different visual indicators for identified textual elements with intrinsic executable computational meaning within a graphical model.

In FIG. 6A and FIG. 6B, the system 100 of FIG. 5A and FIG. 5B is shown with a second transition 200 between the normal state 120 and the shutdown state 104. The second transition 200 includes two textual items, a graphical function "cool( )" 202, which is also shown in detail 210, and custom textual code "active_sensors( )" 204. FIG. 6A shows the system 100 without any indicators. FIG. 6B shows the system 100 with indicators in which the text referring to the graphical function "cool" 202 has been boxed while the textual item referring to the custom textual code "active-sensors" 204 has been highlighted. Those skilled in the art will recognize that alternative indicators based on characteristics of the identified textual items with intrinsic executable computational meaning may be used to achieve the same effect such as coloring the graphical function one color and the custom textual code another color. The use of different indicators based on characteristics helps greatly in understanding the overall makeup of the system.

Those skilled in the art will recognize that the present invention may be extended to provide indicators for other types of textual items in addition to those textual items having intrinsic executable computational meaning. For example, the language processor could be instructed to provide indicators for symbols that refer to input versus output data. Alternatively, the language processor could provide indicators for global data access, non-volatile data symbols, volatile data symbols or symbols that refer to data defined in a data dictionary. Other possible implementations will be apparent to those skilled in the art.

It should be noted that although the examples contained herein have referred to the language processor as the entity assigning the indicators to the textual items identified as having intrinsic executable computational meaning, a separate process using the results of the language processor to perform similar functions is specifically contemplated as within the scope of the present invention.

The timing of the application of indicators to the textual items in the graphical model may vary depending upon the implementation. For example, in one implementation, the indicators will be applied in editing mode to a line of code whenever a user changes the focus such as by switching the mouse cursor to another line or hitting return on the keyboard. This application of the indicators provides a validity check to the user in the event of invalid entries as the language processor will not apply the indicator to text which does not process as a textual item with an intrinsic executable computational meaning. In other words, a misspelled keyword will not be highlighted or otherwise indicated on the graphical model and will accordingly be apparent to the user who would expect the indicator to be present. In an alternative implementation, the indicators may be applied to the graphical model as part of a command completion process during editing of the model by a user. In other words, the auto-completion of a textual item having intrinsic executable computational meaning being entered by a user may result in the immediate application of an indicator to the textual item in the graphical model. The timing of other implementations such as the application of indicators to identified textual elements during a simulation will be recognized by those skilled in the art.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computing device-implemented method comprising:
generating a program code from a graphical model, the graphical model including textual items;
creating, with a computing device, an abstract syntax tree based on the generated program code, the creating:
tokenizing the generated program code into tokens;
identifying executable tokens among the tokens, and
parsing the executable tokens into the abstract syntax tree;
analyzing the abstract syntax tree to identify at least one of the textual items that refers to at least one of a non-volatile data symbol, a volatile data symbol, data defined in a data dictionary, global data access and a symbol distinguishing between input and output data;
determining at least one location, based on the analyzing, at which to provide a visual indicator in the graphical model, the at least one visual indicator corresponding to the at least one identified textual item in the program code; and
displaying, with a display element, the at least one visual indicator in the graphical model at the at least one location.

2. The method of claim 1, wherein providing the at least one visual indicator includes providing the at least one visual indicator in at least one of an editing mode of the graphical model and a simulation mode of the graphical model.

3. The method of claim 1, further comprising:
determining whether at least one portion of the program code has intrinsic executable computational meaning.

4. The method of claim 3, wherein the at least one portion of the program code is determined to have intrinsic executable computational meaning and the intrinsic executable computational meaning includes code identifying at least one of a group of events, data, a graphical function name, a hard coded number, a linked requirement, and a keyword.

5. The method of claim 1, wherein determining the at least one location includes walking the abstract syntax tree.

6. The method of claim 1, wherein the graphical model includes at least one of a state diagram, data flow-based diagram and a block diagram.

7. The method of claim 1, wherein the program code includes an action language.

8. The method of claim 1 wherein a form of the at least one visual indicator varies based upon a type or characteristic of the at least one identified textual item.

9. A system for providing a graphical model, comprising:
a processing element configured to:
generate a program code from a graphical model, the graphical model including textual items,
create an abstract syntax tree based on the generated program code, the creating:
tokenizing the generated program code into tokens;
identifying executable tokens among the tokens, and
parsing the executable tokens into the abstract syntax tree,
analyze the abstract syntax tree to identify a textual item referring to a non-volatile data symbol, a volatile data symbol, data defined in a data dictionary, global data access or a symbol distinguishing between input and output data, and
determine a location, based on the analyzing, at which to provide a visual indicator in the graphical model, the visual indicator corresponding to the identified textual item in the program code; and a display element configured to display the graphical model with the visual indicator.

10. The system of claim 9, wherein the display element is configured to display the graphical model with the visual indicator in at least one of an editing mode of the graphical model and a simulation mode of the graphical model.

11. The system of claim 9, wherein the processing element is further configured to determine at least one portion of the program code having intrinsic executable computational meaning.

12. The system of claim 11, wherein the at least one portion of the program code having intrinsic executable computational meaning includes at least one of a group of events, data, a graphical function name, a hard coded number, a linked requirement, and a keyword.

13. The system of claim 9, wherein determining the location includes walking the abstract syntax tree.

14. The system of claim 9, wherein the graphical model includes at least one of a state diagram, data flow-based diagram and a block diagram.

15. The system of claim 9, wherein the processing element includes at least one language processor.

16. The system of claim 9, wherein the program code includes an action language.

17. A non-transitory computer-readable medium holding computer-executable instructions that when executed cause at least one computing device to:
   generate a program code from a graphical model, the graphical model including textual items;
   create an abstract syntax tree based on the generated program code, the creating:
      tokenizing the generated program code into tokens;
      identifying executable tokens among the tokens, and
      parsing the executable tokens into the abstract syntax tree;
   analyze the abstract syntax tree to identify at least one textual item that refers to at least one of a non-volatile data symbol, a volatile data symbol, data defined in a data dictionary, global data access and a symbol distinguishing between input and output data;
   determine at least one location, based on the analyzing, at which to provide at least one visual indicator in the graphical model, the at least one visual indicator corresponding to the at least one identified textual item in the program code; and
   display the at least one visual indicator in the graphical model at the at least one location.

18. The medium of claim 17, wherein the instructions when executed further cause the at least one computing device to:
   determine at least one portion of the program code having intrinsic executable computational meaning.

19. The medium of claim 18, wherein the at least one portion of the program code having intrinsic executable computational meaning includes at least one of a group of events, data, a graphical function name, a hard coded number, a linked requirement, and a keyword.

20. The medium of claim 17, wherein the instructions when executed further cause the at least one computing device to:
   determine the at least one location by walking the abstract syntax tree.

21. The medium of claim 17, wherein the graphical model includes at least one of a state diagram, data flow-based diagram and a block diagram.

22. The medium of claim 17, wherein the program code includes an action language.

23. The medium of claim 17 wherein a form of the at least one visual indicator varies based upon a type or characteristic of the at least one identified textual item.

24. A non-transitory computer-readable medium holding computer-executable instructions that when executed cause at least one computing device to:
   identify a plurality of textual items in a graphical model, the graphical model being one of a state diagram, data flow-based diagram and block diagram;
   tokenize the plurality of textual items to create tokens;
   identify executable tokens in the created tokens;
   create an abstract syntax tree based on the identified executable tokens;
   analyze the abstract syntax tree to identify at least one textual item;
   based on the analyzing, determine at least one location at which to provide at least one visual indicator in the graphical model, the at least one visual indicator corresponding to the at least one identified textual item; and
   display the at least one visual indicator in the graphical model at the at least one location.

25. The medium of claim 24 wherein the at least one visual indicator is displayed in an editing mode when a user changes input focus.

26. The medium of claim 24 wherein the at least one visual indicator is displayed in an editing mode as part of a command completion process.

27. The medium of claim 24 wherein the at least one visual indicator is displayed during a simulation of the graphical model.

* * * * *

UNITED STATES PATENT AND TRADEMARK OFFICE
CERTIFICATE OF CORRECTION

PATENT NO. : 8,225,275 B2  
APPLICATION NO. : 11/827451  
DATED : July 17, 2012  
INVENTOR(S) : Jay Ryan Torgerson et al.

Page 1 of 1

It is certified that error appears in the above-identified patent and that said Letters Patent is hereby corrected as shown below:

On the Cover Page; (73) Assignee, please change the Assignee from "The Math Works, Inc." to -- The MathWorks, Inc. --

In the Claims:

At column 8, line 45 (claim 8, line 1), please change "claim 1 wherein" to -- claim 1, wherein --

At column 10, line 17 (claim 23, line 1), please change "claim 17 wherein" to -- claim 17, wherein --

At column 10, line 38 (claim 25, line 1), please change "claim 24 wherein" to -- claim 24, wherein --

At column 10, line 41 (claim 26, line 1), please change "claim 24 wherein" to -- claim 24, wherein --

At column 10, line 44 (claim 27, line 1), please change "claim 24 wherein" to -- claim 24, wherein --

Signed and Sealed this  
Ninth Day of October, 2012

David J. Kappos  
*Director of the United States Patent and Trademark Office*